Figure 1:
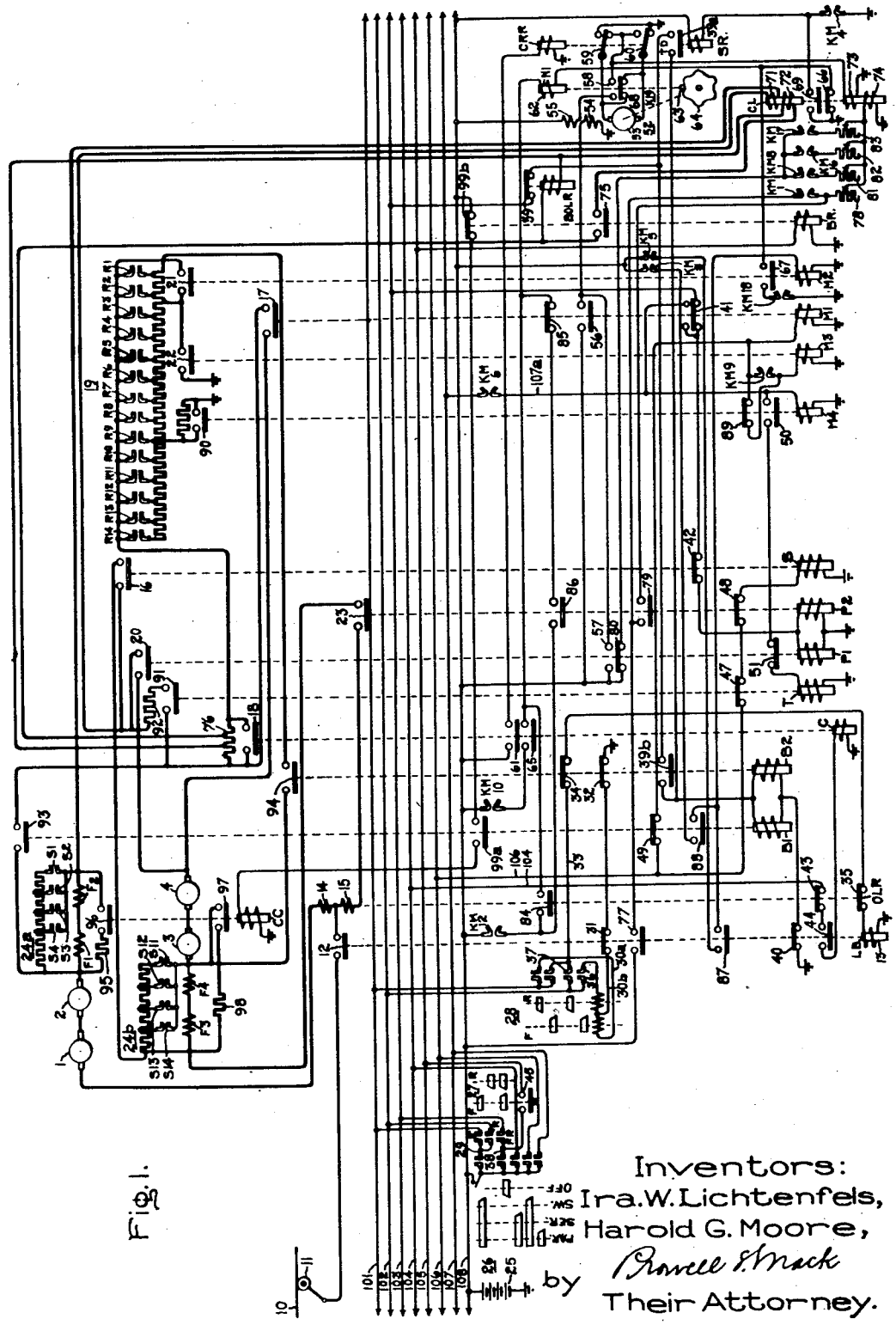

Inventors:
Ira. W. Lichtenfels,
Harold G. Moore,
Their Attorney.

Sept. 4, 1951  I. W. LICHTENFELS ET AL  2,566,898
TRACTION VEHICLE CONTROL SYSTEM
Filed May 28, 1949  3 Sheets-Sheet 2

Inventor:
Ira W. Lichtenfels,
Harold G. Moore,
by [signature]
Their Attorney.

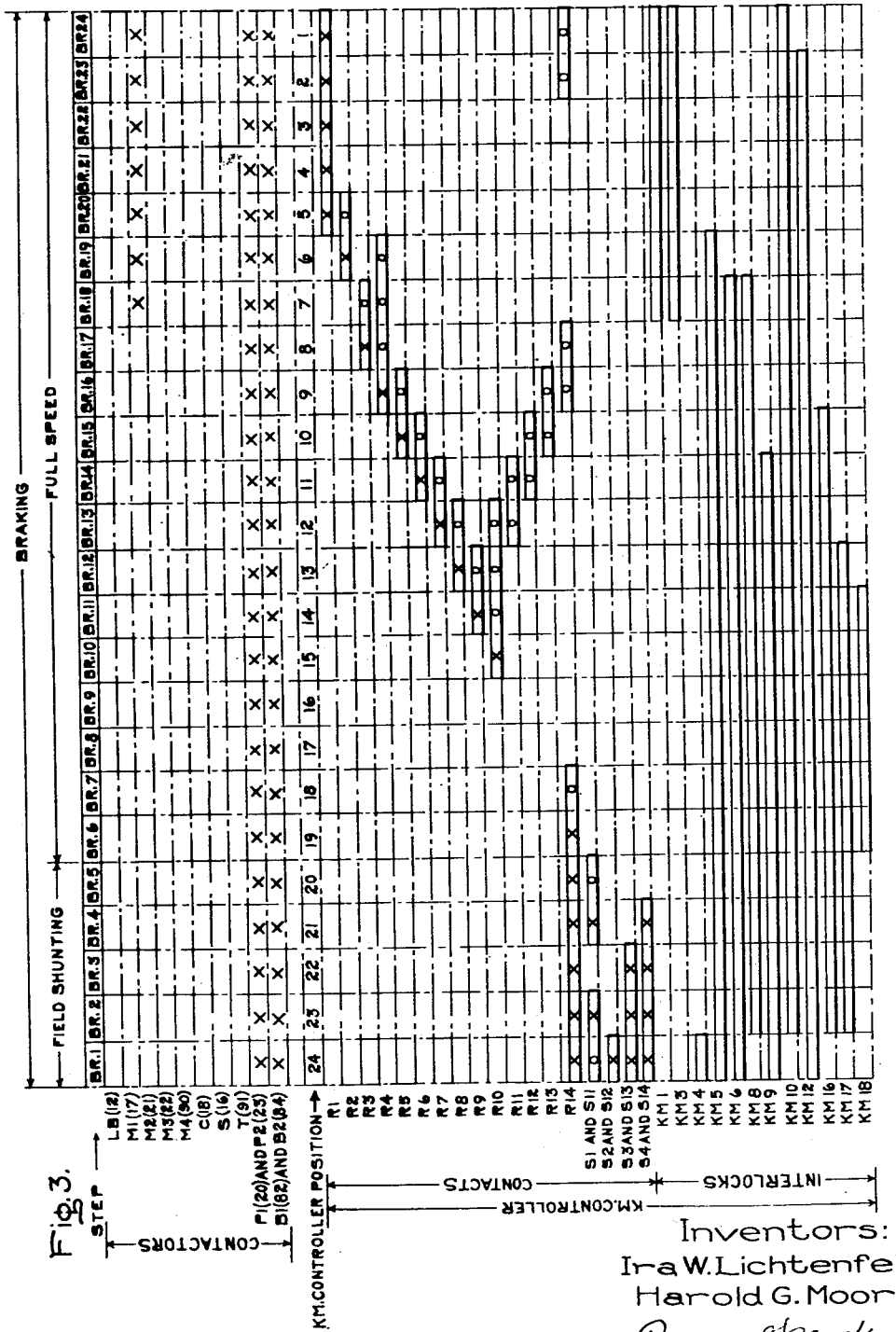
Sept. 4, 1951    I. W. LICHTENFELS ET AL    2,566,898
TRACTION VEHICLE CONTROL SYSTEM
Filed May 28, 1949    3 Sheets-Sheet 3
Inventors:
Ira W. Lichtenfels,
Harold G. Moore,
by Crowell S. Mack
Their Attorney.

UNITED STATES PATENT OFFICE 2,566,898

TRACTION VEHICLE CONTROL SYSTEM

Ira W. Lichtenfels, St. Louis, Mo., and Harold G. Moore, Wesleyville, Pa., assignors to General Electric Company, a corporation of New York Application May 28, 1949, Serial No. 95,908

28 Claims. (Cl. 318—53)

Our invention relates to control systems and apparatus and more particularly to acceleration, and braking control systems for electric vehicles.

Heretofore, it has been known to have traction motors connected in series pairs with certain control devices making it possible to alternatively connect these pairs in series or in parallel with each other, in the proper operating order for accelerating purposes. During such motoring operation, certain resistances are commutated into the motor circuits to aid acceleration. It has also been known in the past to provide dynamic braking for traction motors whereby the motors are caused to act as generators feeding into a preselected amount of resistance to provide a braking effect. Heretofore, however, the controls used for acceleration have not kept the main transition contactors in a position suitable for immediate application of dynamic braking and this has been objectionable from the standpoint of time required to apply braking effect. Therefore, with conventional controls it has been impossible to use dynamic braking to any large extent at high speed operation so that (with heretofore known controls) most of the braking force has to be exerted through brake shoes to provide a mechanical retardation with the disadvantages of dissipation of large amounts of troublesome brake shoe dust, increased mainteance problems, passenger discomfort and excessive noise of operation with the latter disadvantage being especially apparent in confined locations such as subway tunnels.

Furthermore in vehicles of the multiple-unit type where a plurality of vehicles are each self powered but all are to be controlled from a selected master control station in one vehicle, it has been known to provide electric train lines to interconnect the vehicles from a control standpoint but existing controls have been of the air engine cam actuated type which could be provided with only a limited number of accelerating steps and it is practically impossible at all times to utilize dynamic braking with such controls.

It is an object of the present invention to provide simple and inexpensive means for overcoming the above difficulties.

It is another object of the present invention to provide a traction motor control system capable of providing automatic dynamic-braking-circuit regulation together with higher acceleration rates and smoother operation than that afforded by conventional constructions.

It is another object of the present invention to provide for the drive motors of a plurality of articulated independently powered traction vehicles, a control system which will allow reduced maintenance and longer life of the requisite control equipment.

Another object of the present invention is to provide a traction vehicle control adapted to allow full progression of an acceleration resistance-shunting controller irrespective of transition supervisory control, delayed transition from series to parallel according to both supervisory control action and positioning of said accelerating resistance shunting controller, and provision for immediate application of dynamic braking at any position of said controller and irrespective of prior action of said supervisory control.

It is another object of the present invention to provide, in a system of the type described, a progression of control such that the position of both accelerating and dynamic braking controls is always a function of car speed, whereby fast dynamic brake response may be obtained at any car speed.

It is a still further object of the present invention to provide an all-electric motor-operated controller as the main unit of the above-mentioned control system, thereby to simplify the control circuits (by providing a minimum number of relay interlocks), provide quicker response for stopping and starting, and a more flexible control under all conditions.

It is a further object of the present invention to provide an entirely new type of electric notching for a motor operated controller providing for many steps of rheostatic armature voltage control, multiple field shunting steps, and at the same time making provision for dynamic braking of the main traction motors.

Among the means employed in the embodiment herein illustrated and described is, for each of a plurality of articulated vehicles, an electric motor-operated controller with an all electric notching mechanism for a star wheel which allows progression of the control as a function of car speed. Such an arrangement can be made to position with better accuracy than a conventional hand or motor operated star wheel (with a spring biased notching pawl or roller for mehanically positioning the star wheel when stopped) and eliminates maintenance problems and also eliminates any tendency to skip over points. Such skipping has been a common fault on conventional controllers in many applications. Modern subway and rapid transit units are adapted to be operated in multiple units up to 10 cars (which may represent an operative train with motive power of 4000 HP) and the elimination of this tendency to skip greatly reduces relative motion between cars, as well as materially decreasing maintenance problems.

Figure 2:
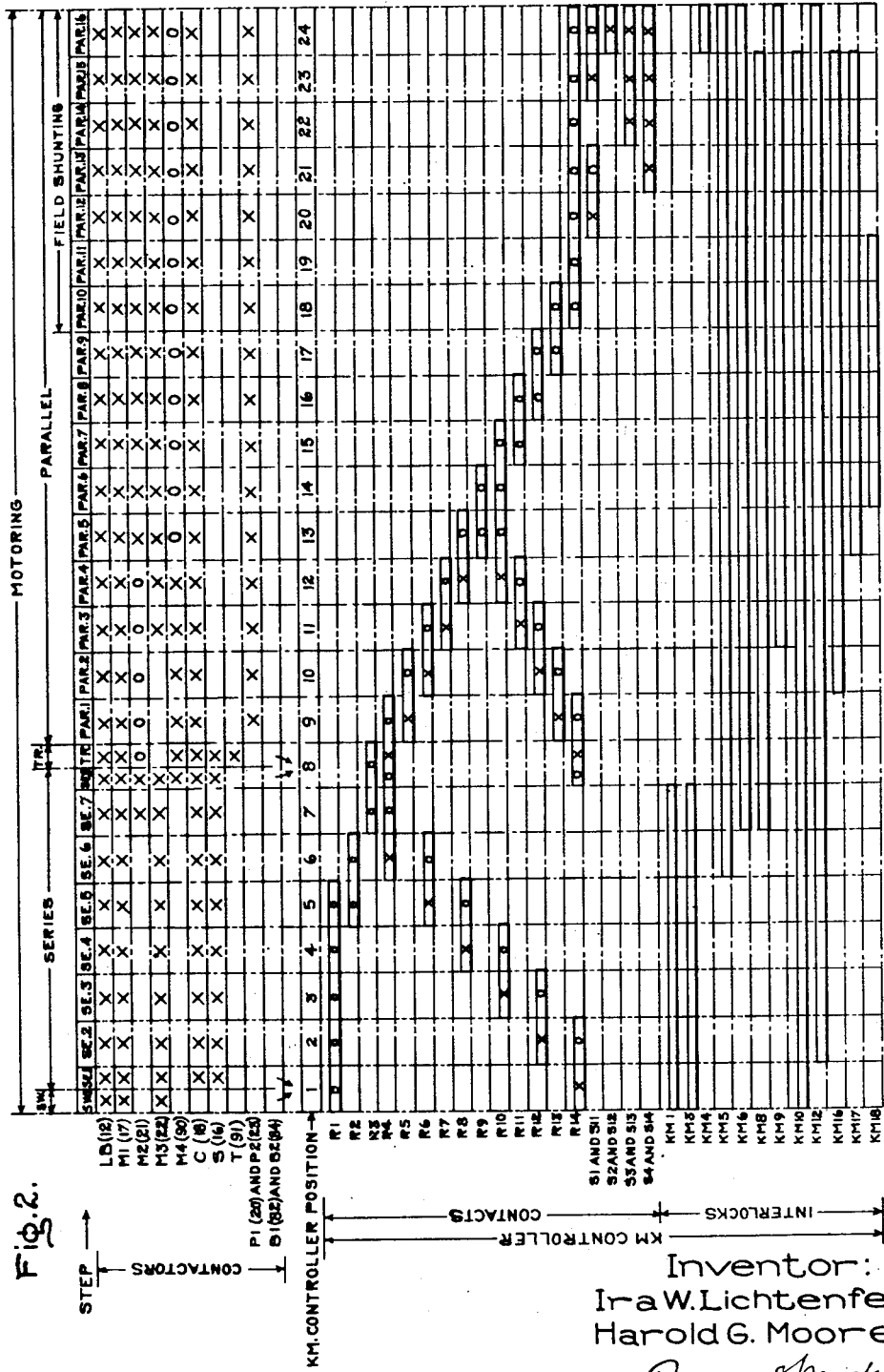

Other objects and advantages will become apparent and our invention will be better understood from consideration of the following description taken in connection with the accompanying drawing in which Fig. 1 is a schematic representation of power and control circuits (including a motor operated controller) of one unit of a multiple unit train of vehicles, Fig. 2 is a diagrammatic representation of acceleration sequences of main contactors together with acceleration sequence of operation of contacts and interlocks on the motor-operated controller shown in Fig. 1; and Fig. 3 is a diagrammatic representation of the braking sequence of the same contacts and interlocks as shown in Fig. 2.

As seen in Fig. 1, the control system is illustrated as applied to a plurality of traction motors of which 1 and 2 are permanently connected in series and 3 and 4 are permanently connected in series and the series pairs thereby defined are adapted to be alternatively connected in series or in parallel. Each motor is provided with a series type field winding, F1—F4, respectively. If desired conventional provisions may be included in the motor circuits for selectively operating the respective motors through electromagnetically operated forward or reverse switches (not shown).

Power is derived from any suitable source such as a third rail or the overhead trolley wire 10 from a collector 11 through any suitable arrangement of fuses and manually operated disconnect switches (not shown) to provide potential with respect to the assumed ground return circuit. The power circuits have voltage applied when a line breaker LB contact 12 is closed due to energization of the LB contactor coil 13. When this breaker is so closed, power is supplied to the motor circuits through overload relay (OLR) coils 14 and 15. For starting (that is for the series connection of the series pairs) the circuit may be traced from overload relay coil 14 to the armature of motor 1, motor 2, the field of motor 1, field of motor 2, through a coil 71 of a current limit relay CL, through a contact 16 of a series contactor S, through the field F3 of motor 3, through the field F4 of motor 4, through the armature of motor 3, armature of motor 4, through a normally (i. e., when deenergized) open contact 17 of a main line contactor M1, through a normally-open contact 18 on a cushioning contactor C, and through an accelerating resistance, indicated generally at 19, to ground. After transition and after all accelerating resistance is out (that is, at high speed operation) the parallel connection of the series pairs may be traced as follows: one circuit from overload relay coil 14 to armature 1, armature 2, field F1, field F2, CL coil 71, a contact 20 on parallel contactor P1, M1 contact 17, C contact 18, through contact 21 of a line contactor M2, through contact 22 of a line contactor M3, to ground; the other (parallel circuit) from overload relay coil 15 to contact 23 of parallel contactor P2, to F3, F4, armature 3, armature 4, contact 17, contact 18, contact 21, contact 22, to ground.

In addition to the control described herein making it possible to connect the motor pairs in series and in parallel in proper operating order for accelerating purposes, during motoring operation certain portions of an accelerating resistance (indicated at 19) are commutated into the motor circuits to aid acceleration, and in conventional manner field shunting resistances (and contacts) indicated generally at 24a are provided for the fields of motors 1 and 2, and field shunting resistances (and contacts) indicated generally at 24b are provided for motors 3 and 4. For dynamic braking operation, other control devices are operated to connect the motors as generators and load their output into resistance, as hereinafter more fully explained, in order to obtain proper braking at the various speeds by commutating into the circuit different resistance according to speed.

In general it may be said that since active dynamic braking resistance must increase with increase of speed (e. g., dynamic braking at 40 M. P. H. will require twice as much resistance as at 20 M. P. H.), the control is arranged to provide that whatever resistance is cut out as accelerating speeds are increased is the amount available for immediate braking.

Modern traction power equipments operate at voltages (such as 600 volts) which are too high for control circuit use and, therefore, it is desirable to provide that control potential be taken from some lower voltage source such as a 32 volt battery 25. If desired, conventional battery charging equipment (not shown) may be used. Although Fig. 1 is a circuit diagram showing the traction motor circuits and control circuits on one of several identical driving units or vehicles adapted to be driven under their own power, it should be understood that control of the entire train is ordinarily initiated from the master controller located at the head end of the leading one of the identical cars. However, with the present system control can come from any one of the master controller stations of which there may be two per car, although but one is shown in the drawing (26 and 27).

The main control train line circuits between cars are numbered 101–108, inclusive, and include the line 108 energized from the battery 25 of each car so that if a car's control power fails for any reason, its control power will be temporarily furnished from the other cars. For each individual car (as shown in Fig. 1) control voltage may be furnished from wire 108 through a control switch to an operator's control station which comprises a master controller 26 of the hand operated type and having four operating positions as follows:

1. Off (or "coasting")
2. Switching (or extra low speed operation)
3. Series running
4. Parallel running With master controller 26 in the "Switching" position the motors are connected in series and in series with all the accelerating resistance. The control is not allowed to progress; that is the cam-operated resistor contactors do not function. This operating position is used primarily for coupling or low speed maneuvering or switching in the yards.

In the "Series" position the control advances cutting out resistance step by step until all motors are in series across the line, then "spotting" ahead as speed increases to be in proper position for dynamic braking.

In the "Parallel" position, the control is allowed to progress automatically to the final accelerating step with motors in series-parallel connection and the fields shunted to approximately 50% strength.

The operator's control station also comprises a hand operated "forward-reverse" switch 27. If desired a single controller box may be used with the master controller 26 driven by one operator's handle (through a main shaft) and the "Forward-Reverse" master 27 driven by an auxiliary handle (through a separate reverse shaft).

The main shaft (or controller 26) functions to energize in proper sequence the eight train line wires (101—108) for controlling all power and braking operations of each car. The main function of the reverse shaft (or switch 27) which is rotated by the reverse lever, is to remotely control through the train line circuits a conventional traction motor reverser located in each car. This reverser (indicated at 28 for the car shown) may be used to initiate actuation of conventional reversing contacts associated with each motor circuit (not shown).

When the master handle of switch 26 is moved from "off" to "switching" position, wire 29 is energized and this wire in turn energizes contacts on forward-reverse switch 27 such that train line 101 is energized for forward operation and train line 102 is energized for reverse operation.

Train lines 101 and 102 lead to contacts on the electrically operated reverser 28 on each car and this reverser assures that the proper forward or reverse motor circuit contactors are operated. As previously indicated the operation of reverser 28 on such contactors is purely conventional, will be understood by all those skilled in the art, and is not detailed herein except to say that the reverser on every car will be energized from the master control unit when the latter is moved from off to switching position (if reverse switch 27 is in one position or the other).

Energizing train line 101 will energize the forward magnet coil F of the reserver 28 (when the reverser is in the reverse position) through reverser interlock, wire 30a, "F" coil, wire 30b, normally closed interlock 31 of LB, normally closed interlock 32 of a braking contactor B2, to ground.

When the reverser throws to forward the line breaker LB is energized from train line No. 101 as follows: through reverser contact to wire 33, through the normally closed interlock 34 of B2, through the normally closed contact 35 of overload relay OLR, to operating coil 13 of line breaker LB, to ground.

Train line No. 102 is energized when the master controller 26 is in the switching (or in the series or parallel) position and when the reversing switch 27 is in the reverse position. This is accomplished by connecting wire from line 108 through a contact of the controller 26 to wire 29, through the reverse contact (R) of the reversing switch 27, to train line 102.

Energizing train line No. 102 operates through the "Forward-Reverser" interlock 36 (when the reverser has been left at "Forward") to energize the reverser reverse magnet coil (R), through wire 30b, interlock 31 of LB, interlock 32 of B2, to ground.

When the reverser throws to reverse position, the line breaker LB coil 13 is energized under control of train line 102 through interlock 37 of reverser 28, interlock 34 of B2, interlock 35 of OLR, through LB coil 13, to ground.

Train line No. 103 is energized when the master controller 26 is off, through normally closed interlock on master controller 26 to wire 38, through forward and reverse closed contact (FR) on reversing switch 27, to train line 103.

Energizing train line No. 103 sets up control circuits for coasting and dynamic braking. A pair of braking contactors B1 and B2 are energized from train line 103 through an interlock 39 on a "Brake Overload Relay" BOLR and through an interlock 39a on a spotting Relay SR (or alternately through B2 interlock 39b) through the paralleled coils of B1 and B2 relays, through normally closed LB interlock 40, to ground.

Train line No. 103 also energizes a pair of parallel contactors P1 and P2. This is done through normally closed interlock 41 on line contactor M1, normally closed interlock 42 on series contactor S, through the parallel P1 and P2 coils, to ground.

Train line No. 104 is energized when the master controller 26 is in the "Series" or in the "Parallel" position. Energizing train line No. 104 causes the cushioning contactor "C" to pick up through a normally closed interlock 43 on overload relay OLR, interlock 44 on contactor LB, coil "C," to ground. At slow speeds, opening and closing of "C" (when going from switching to series and back) commutates a resistance 76 out of and into the motor circuit to provide a cushioning action.

Train line No. 105 is energized by throwing master controller 26 to "Off" and making a service application of the air brakes. This is accomplished by energization from wire 38 through an air brake valve (not shown) auxiliary electrical contact 45. Energizing train line No. 105 energizes a braking relay BR (on each car) which sets up circuits to differentiate between coasting and braking.

Train line No. 106 is energized in the "Switching," "Series" and "Parallel" positions of the master controller 26. This line picks up the series contactor "S" (from line 106) through a normally closed contact 47 of a transition contactor T, through normally closed interlock 48 of parallel contactor P2, to coil of "S," to ground. This sets up the traction motors in series connection, locks out the parallel contactors for the "Series" position of the master controller, and prevents false operation of series and parallel contactors at the same time.

Train line 106 also operates (through a normally closed interlock 49 on B1) to energize line contactors M1 and M3 during motoring operation. M1 and M3 main contacts (17 and 22 respectively) complete the circuit through the accelerating resistors 19 from the traction motors to ground.

Train line No. 107 is energized when the master controller is moved to the "Parallel" position. Energizing 107 will transfer control power to wire 107a through a contact KM6 of the motor-operated controller KM hereinafter more fully described. For the present, it is sufficient to say that contact KM6 is closed when the motor controller is in positions 7 through 24 (see Figs. 2 and 3). Wire 107a energizes contactor M4. M4 going in picks up transition contactor T through M4 contact 50 and normally closed interlock 51 on P1. T going in causes series contactor S to drop out and this action also sets up the traction motors for parallel operation.

The heart of the control is the motor-operated controller (KM) and an electrical pilot motor 52 is the prime mover of this controller. The controller comprises a series of resistor circuit contactors as well as interlocks which may be assembled on each side of a cam shaft to be adapted to be actuated thereby. The cam shaft rotates in one direction during acceleration and in the other direction during coasting and dynamic braking. The shaft can be rotated in either direction by the small pilot motor 52 under the constant control of a current responsive relay CL which operates a notching interlock (NI) so that the correct sequence of operation of contactors is positively assured.

The pilot motor 52 comprises an armature 53, a shunt type field 54 and a series field 55. The energization for the shunt type field 52 is received from Train Line No. 108 through an interlock 56 on contactor M1 (during switching, series or parallel acceleration, or running) or through interlock 57 on contactor P1 (during braking and coasting). The armature 53 and series field 55 are energized from line 108 through series field 55 to an interlock 58 on a notching interlock relay N1, through contact 59 (or contact 60) of a controller reverser relay CRR, through the armature 53, back through the other contact of CRR, to ground.

The controller reverser relay CRR reverses the pilot motor armature connections so as to drive the controller KM toward "on" or toward "off" positions. The coil of relay CRR is energized from train line No. 108 through an interlock 61 on cushioning contactor C. C contactor is energized in all power positions except in switching at low speed. Thus the control will not progress when master control switch 25 is in "switching" position. When the master controller is thrown from "series" or "parallel" to "Off," "C" contactor drops out. C going out drops out CRR thus reversing the pilot motor armature connections for driving the KM controller toward off position.

The pilot motor of the KM controller is started by the closing of the contact 58 of the notch interlock relay N1. This notching mechanism comprises a solenoid coil 62 connected to operate a cam or roller 63 which engages a star wheel 64. Star wheel 64 is adapted to be driven by the pilot motor 52 and the operation of the notching mechanism is such that the motor cannot drive the KM controller to which it is geared unless N1 coil 62 is energized so that cam 63 will not engage any of the indentations of star wheel 64 for otherwise power will not be provided to the motor armature 53. Notch interlock coil 62 is energized from train line 108 through KM 10 interlock (closed in positions 1 through 23), through C contactor interlock 65 (closed for all motoring stops), to coil 62, through interlock 66 (normally closed) of current limit relay CL to ground. Under certain conditions opening of any of these devices stops progression of control. The CL contact 66 circuit is bypassed by M2 contactor interlock 67 in series with KM18 contact of the motor controller, permitting progression of control from the 14th to the 19th positions during acceleration (see Fig. 2). Operation of the KM notch interlock NI allows the control to advance (except from 14—19 positions, as above) until the CL current limit relay picks up, deenergizing the notch interlock coil 62 which in 'urn opens NI interlock 58 disconnecting power .rom the motor. Deenergization of NI coil 62 also short circuits the pilot motor armature through interlock 68. Meanwhile, notch interlock cam 63 engages the star wheel to allow the motor to be stopped only on a definite notch. It should be observed that this is accomplished electrically with some mechanical interlocking but through electrically controlled and electric controlling means. Of course, the whole controller KM is so arranged that at every point of stopping each KM contact will be either definitely opened or definitely closed at the same time that dynamic braking action (through contact 68) provides quick stopping of the pilot motor 52.

The NI coil is deenergized primarily responsive to actuation of current limit relay CL. The current limit relay comprises a series coil 71, brake coil 72, lift coil 73 and rate coil 74 all mounted on the same core and operating an armature on which is mounted normally closed contact 66 and normally open contact 69. The series coil 71 is connected in series with the No. 1 and No. 2 traction motors as already mentioned. The brake coil 72 is connected through an interlock 75 on braking relay BR (which differentiates between braking and coasting) to a portion of the main motors braking circuit (such as across a portion of cushioning resistor 76), so that during braking the brake coil 72 will aid the series coil 71 in operating the relay. The lift coil 73 is connected across the armature 53 of the pilot motor through interlock 59 or 60. As the speed of the pilot motor increases when running, the current through the lift coil increases thus aiding the pull of the series coil and causing the relay armature to pick up when the proper values of current through its coils are reached. The value of series coil current required will be different for the different conditions of operation as determined by the connections to the CL rate coil 74, described below. Operation of the CL relay deenergizes the notch interlock coil (62) thus stopping the KM motor.

For switching and series operation of the car the rate coil 74 is connected from train line 108, through an interlock 77 on LB, through KM1 contact (which is closed in the first to seventh positions of the KM controller), through an adjustable resistor 78, through rate coil 74, to ground.

For parallel operation the action is the same as above except that the KM1 contact is bypassed by the interlock 79 of P2.

In order to recalibrate the relay for different drop out currents (when the master controller is thrown from "Parallel" to any other position) according to the predetermined position of the motor-operated controller then existing, a plurality of circuits energized through P1 interlock 80 are provided in parallel with the above described connections to the CL rate coil 74. These paralleled circuits energized from line 108 through interlock 80 comprise an adjustable resistor 81 included in the circuit when motor controller interlock KM8 is closed (8th to 23rd positions), an adjustable resistor 82 which is paralleled in the circuit when interlock KM16 is closed (10th to 23rd positions) and an adjustable resistance 83 which is included in the circuit when KM17 is closed (13th to 23rd positions).

All of the resistors are adapted to be manually adjusted for optimum performance so that the paralleling of the resistors actually recalibrates the CL relay for different pickup and drop out currents through the series coils 71 and 72 for different operating conditions. Furthermore, the basic resistor 78, or a separate load rheostat in series therewith, may be arranged to be actuated by a load weighing device so that the rate coil excitation may be adjusted to such value that an optimum accelerating rate may be applied as determined by existing passenger or other weight load in the car. For parallel operation P1 interlock 80 will be open (and P2 interlock 79 closed) and the only rate coil connection will be through LB interlock 77, through P2 interlock 79, to resistor 78.

Additional provision can be made to vary the rate of pickup of relay CL during braking operation by making additional connection (not shown) either to rate coil 74, or to brake coil 72, and if desired there may be placed in the circuit a rheostat which is responsive to air brake pressure thereby to vary the excitation of CL according to braking effort called for.

The action of the CL relay picking up, de-energizes the NI notch interlock coil 62 thus stopping the pilot motor and the whole KM controller, that is, unless CL contact 66 is by-passed through M2 interlock 67 and KM18 (which will be only during acceleration through controller positions 14—19).

It is desirable to provide as shown in the drawing, that the NI coil 62 energizing circuit is completed not only through C interlock 65 and KM10 (1st—23rd positions of motoring only), but alternatively through a normally open interlock 84 on OLR whenever KM12 is closed (in the 2nd through 24th positions) to allow retrogression after an overload trip, and also alternatively through (during braking only) M1 interlock 85 and P2 interlock 86, whenever KM12 is closed.

However, as already indicated the notch interlock coil 62 is primarily under control of the CL relay which when picked up de-energizes NI coil 62 thus stopping progression of the KM controller. With CL picked up, the spotting relay SR will be energized (regardless of motor controller position) through CL interlock 69. SR can be energized with CL relay dropped out through KM4 when the motor operated controller is in the 24th position. The purpose of the SR relay is hereinafter fully explained, in connection with operation during braking overloads.

The operation may be better understood by reference to Figs. 2 and 3. Fig. 2 provides a tabulation of contactor operation for all steps of motoring. Fig. 2 also shows a cam development for the motor-operated KM controller. Superimposed on this cam development is a tabulation (indicating whether current is passing) for all KM power circuit contacts for the motoring operation sequence.

Fig. 3 provides a tabulation of contactor and KM contact operation for all steps of braking. In the tabulation of both Fig. 2 and Fig. 3, "O" indicates that the associated contact is closed but not carrying current, and "X" indicates that the associated contact is closed and carrying current.

Fig. 3 also applies to the coasting sequence. Whenever the control is in coasting sequence (i. e., Master 26 at "Off" and brake interlock 45 not closed) it is desirable to make some provision such as additional shunting of the motor fields so that high braking torque will not be exerted although there will be some braking torque sufficient to prevent overspeeding on long downgrades Such provision is shown on the drawing (for motors 1 and 2) by resistance 95 in series with an interlock 96 adapted to short out fields F1 and F2. Interlock 96 is on a coasting contactor CC which also has a similar interlock 97 adapted to apply a resistance 98 to shunt out the fields F3 and F4 of motors 3 and 4. The coil of CC contactor is energized through a B1 interlock 99a and a BR interlock 99b. Thus coasting and braking sequences are continuous and the same, except that at coasting the motor field circuits are shunted and the circuit limit relay is set to regulate at a lower value of generated current (because BR is deenergized so that CL brake coil 72 is ineffective).

It will be understood from the above description and from Fig. 1 that overload protection is provided both during acceleration and during dynamic braking. Either coil of overload relay OLR will trip the relay when the current in the associated traction motor circuit is above the relay setting. Tripping of OLR de-energizes line breaker (followed by contactor C) opening the main power circuits.

As previously explained the motor contactor M1 is energized from line 106 (switching, series, parallel). Motor contactor M2 is energized from the "plus" line 108 through an LB interlock 87 (in series with KM5) from 6th—24th positions during motoring, or alternatively through B1 interlock 88 (in series with KM3) from 7th—1st positions of the KM motor controller during braking. Motor contactor M3 is energized from the same source that energizes M1 except through either the interlock 89 or M4 or through KM9 (closed from 11th to 24th positions). Motor contactor M4 is energized from "Parallel" line 107 through KM6 to line 107a as already explained. Closing of the main contacts (i. e., M1 contact 17, M2 contact 21, M3 contact 22, and an M4 contact 90) sets up the motor circuits for progressively less and less starting resistance while intermediate steps are taken care of by the motor controller contacts R1—R14, incl.

At the point of transition from series to parallel operation of the series pairs, transition contactor T closes its main contact 91 to temporarily insert into the circuit a transition resistance 92.

For the purpose of understanding the dynamic braking features of the control, it should be noted that the system employed is one of resistance rather than regenerative braking. This means that the braking action is completely independent of trolley or third rail power and will, therefore, perform exactly the same even if such power is lost. With the arrangement herein illustrated and described, during braking each series pair of motor armatures is arranged to excite the series fields of the other pair of motors. This arrangement not only simplifies the required reversal of field potential for a braking action, but also assures that the series pairs will equally share the load and thereby provide the utmost stability of operation.

With the controls illustrated and described, there are many steps of dynamic braking each especially adapted for a single set of operating conditions. At any of the steps the line breaker LB is deenergized so that there is no power connection to the trolley. The power circuits may be traced for three representative steps as follows:

*1.—Dynamic braking at high speed operation (with all accelerating resistance used as braking resistance and with the fields shunted)*

The armatures of motors 1 and 2 provide current which passes through a contact 93 on braking contactor B1, through cushioning resistance 76, through contact R14 on the motor-operated (KM) controller, through all of the accelerating resistances indicated generally at 19, through a contact 94 of braking contact B2, through fields F4 and F3 (and in a parallel path through the strong field shunting circuit provided by S11, S12, S13, and S14 all being closed on the motor operated KM controller), through contact 23 of P2, through OLR coil 15, OLR coil 14, and back to the armature of motor 1. Meanwhile a similar circuit is provided from the armatures 3 and 4 closed upon the shunted series fields F1 and F2 through the resistance 19.

2.—*Dynamic braking at medium speed operation (with full braking resistance, but with field shunting removed)*

This circuit is the same as that described above except that S1—S4 and S11—S14 are all open, as may be readily understood from consideration of the tabulation of Fig. 3.

3.—*Dynamic braking fading out at low speed (with all variable resistance out and with field shunting removed)*

The circuit may be traced (Fig. 1) from armature 3, through armature 4, through P1 contact 20, through CL coil 71, through F2 and F1, through B1 contact 93, through cushioning resistance 76, through KM contact R1, through B2 contact 94, back to armature 3.

It will be observed that the sequence of operating steps of Fig. 2, reading from left to right, indicates a progression toward ultimate full speed operation whereas the sequence of operating steps of Fig. 3, reading from left to right, indicates the opposite progression, that is from full speed to full stop. The motoring sequence of Fig. 2 is initiated by moving master controller 26 from the "Off" to "Series" (or "Parallel") position, whereas the sequence of Fig. 3 may be initiated in a number of different ways dependent, somewhat, on whether braking or coasting is required.

As previously indicated, tripping of OLR deenergizes LB and, through OLR interlock 84, energizes NI coil 62 of the notching mechanism. At the same time deenergization of LB drops out C contractor, and C interlock 61 opens to drop out CRR so that the pilot motor will run towards the "Off" position until it gets back to the No. 1 position of the KM controller when KM12 opens, deenergizing NI coil 62. The overload relay OLR may be reset in any conventional manner either mechanically (for each car) or electrically through an additional train line (not shown) from the master control station. Resetting of OLR, in whatever manner, will close line breaker LB to close contactor C and energize CRR to set up circuits so that the pilot motor will again run towards the "On" position to advance the control for normal operation.

Any time that the master controller 26 is thrown to "Off," LB drops out, C drops out, and CRR drops out to reverse the progression through reversal of pilot motor operation whenever NI is picked up. The operation of NI is dependent on action of CL. In coasting it is desired to have the control retrogress only slowly and hence CL and NI operate only infrequently. But when braking is called for such as by operator-initiated actuation of the brake valve (for release of conventional air-restrained brake shoes) and associated interlock 45 (energizing train line 105, coil of BR, and CL brake coil 72), CL and NI operate frequently and allow fast return of the controller to match rapid decrease of car speed.

Advancing master controller 26 from the "Off" position will close LB, close C, and energize CRR thus setting the associated circuits so that the pilot motor will again run to advance the control for motoring operation.

With any normal control (i. e., no braking overload) the motor operated controller will always be in a position corresponding to the speed of the car to get proper action for drive motor dynamic braking. With any overload it is desirable to re-arrange the motor circuits for a lower operating current, but this means that for a motoring overload the motor operated controller should go back towards position 1 while for a braking overload the motor operated controller should go towards position 24. It is therefore desirable to provide both normal overload protection and a separate dynamic braking overload relay (BOLR) inserted somewhere in the braking circuit such as across a portion of the cushioning resistance 76. As previously mentioned BOLR has its contact 39 in the circuit which is adapted to provide energization for contactors B1—B2.

During dynamic braking, excessive dynamic brake current will actuate relay BOLR which will drop out the braking contractors B1 and B2. During this time the motor controller will continue to advance towards the "Off" (i. e., 1st) position. The separate BOLR relay in each car may be reset in any convenient manner, but it would not be safe to allow the dynamic braking circuits to be reestablished with the motor controller in the full "Off" position and the cars going at high speed. Such action would result in a temporary high overload and another tripping of BOLR as the controller must be in a position corresponding to the speed of the car to get proper action of the dynamic braking. To assure that the control returns to a normal position after braking overload, dynamic braking circuits cannot be reestablished until spotting relay SR is picked up. To pick up SR relay requires that either the KM controller be advanced to the full "On" position so that KM4 contact (closed in position 24) can complete the SR coil circuit, or the controller must be advanced far enough to pick up the CL relay contact 69 of which will complete the SR coil circuit.

Operation of the notching mechanism circuits may be quickly reviewed by stating that for "Switching" (C open) NI coil is de-energized and pilot motor operation is held up, for "Series" (or "Parallel") C closes and the motor is free to run so long as CL is dropped out. The CL coils are so connected that all carrying current exert a pull in the same direction. During acceleration the series, rate and lift coils all exert some pull, and as soon as CL picks up the pilot motor will stop unless the progression is far enough advanced for M2 to be closed in which case the controller will run through to the field shunting position when KM18 opens again placing the NI coil 62 under the control of CL. For braking, all of the CL coils carry current (and all exert pull in the same direction). For braking or coasting the NI coil is practically under the sole control of CL and is energized whenever CL is dropped out (except on position 1 when KM12 is open and functions as an end of travel limit switch).

However, in order to allow quick dynamic brake response and slow controller operation during coasting, a wide range of controller speeds is necessary, and it is in this connection that the notching system described has special significance. The system uses the reluctance of the magnetic circuit of the driving motor to absorb all shocks incident to rapid operation with a resultant cushioning action superior to any which could readily be provided by any sort of mechanical notching alone.

In this connection it should be noted that the star wheel 84 does practically no mechanical braking but merely assures that the control will start and stop with the KM main contacts and control fingers fully engaged or disengaged.

The compound wound pilot motor has strong series excitation for rapid acceleration and continuous shunt excitation for rapid application of dynamic braking (of pilot motor itself) at any time. The motor stops so quickly it prevents coasting past any notch but the electrical circuits, (i. e., field 54, NI interlock 68, and armature 53) take the major impact forces and thereby materially reduce maintenance problems as compared with previous motor operated controllers.

In order to have an alert and responsive control system it is necessary that the control be capable of advancing at a maximum rate several times the speed that it will be required to move after it has reached a regulating point. This is especially true in the case of dynamic brake control where it is highly advantageous to adjust the braking load resistance to the critical value as soon as possible after the main braking circuit has been established. It is also necessary that the control should not advance more rapidly than the traction motors will build up as self-excited generators. To provide fast but smooth operation of control a very great amount of anticipation is desirably built into the control system such as that furnished by the lift coil 73 provided on the current limit relay and measuring the voltage across the pilot motor armature. This provides an excitation on the current limit relay proportional to armature voltage on the pilot motor which, in turn, is a function of the speed of the pilot motor. Assuming that all the circuits have been established to cause voltage to be applied to the pilot motor armature, as soon as the motor starts to move the armature voltage will start to increase as the motor comes up to speed. This voltage is applied to the current limit lift coil. With motion of the control from one step to another, the result of this additional excitation plus the change in main traction motor current in series coil 71 (due to the fact that this main motor current is close to the regulating point) will pick up the CL relay between steps. The result is that when the main motor current is close to its regulating value, the control will recognize each step and the current limit relay will decide on the basis of dropout setting whether to advance to the next step. If the traction motor current is appreciably below the value at which it is desired to regulate, both the main traction motor current in the series coil 71 of the current limit relay, and the effect of the lift coil 73 may not be sufficient to pick up the current limit relay, so that the control will continue to advance until the relay is picked up. Continued advancement of the main control at high speed increases the voltage across the CL lift coil circuit by a change in armature voltage of the pilot motor. The greater the distance the pilot motor must drive the control to get it into a regulating position, the greater will be the effect of the lift coil, hence the greater amount of anticipation provided for the control system. The notching interlock mechanism which is adapted to be actuated by the relay coil 62 is also held closed mechanically after the controller has advanced approximately one-third of the distance between steps regardless of energization of 62. Thus once the control starts to take a step (moves one-third of the distance) it must continue to advance to the next step even though the current limit relay may pick up tending to stop control progression. The net result is that when a quick change in current is called for, the control advances at full speed, but as soon as the current starts to build up and approaches the final regulating point, the control slows down producing a fast, but smooth, response.

It is relatively simple to adjust controls of the type described to automatically fix the rate of acceleration at a predetermined value (such as 2½ M. P. H. per sec. which requires a great number of notching steps to provide smooth acceleration up to a maximum speed of, say, 60 M. P. H.). With the control described it is also possible to automatically fix the rate of deceleration down to a certain low speed (say 10 M. P. H.) where the dynamic braking fades out. Further it has been found that with a system of the type described more than 95% of the kinetic energy absorbed in braking from 50 M. P. H. can be dissipated in the dynamic braking circuits with the resultant advantages of materially reducing mechanical brake shoe dust and noise of operation.

Significant in connection with the great number of steps preferably required for both acceleration and deceleration as above indicated, is the fact that an electric motor operated controller allows the use of many more cam operated contactors and control fingers than would be possible with a conventional hand-operated or air-operated controller. Electrical operation not only thus simplifies the control, and also materially reduces the number of relay interlocks required, but also assures that the control circuits (through KM fingers) will always open and close in proper sequence with relation to the main KM contacts, thereby affording greater reliability in operation and quicker starting and stopping response.

Further with the control described it is possible to continuously "spot" the control in proportion to car speed, enabling it to respond quickly whenever brake application is called for. For example, arrangements can readily be made so that during coasting below a predetermined speed (of say 42 M. P. H.) the motor controller will notch slowly back toward its starting position under control of the current responsive relay CL which is compounded to regulate (i e., to drop out and energize NI coil) at low values of braking current. The current limit will regulate at higher values of current for motoring, and at all times the electrically operated notching mechanism and the pilot motor control circuit design provide an inherent cushioning action which affords long trouble free operation even with the use of relatively light parts. But for either coasting or braking the main motor current will be proportional to motor speed and, therefore, the current responsive control as described is likewise responsive to vehicle speed.

In addition, the controls described offer a novel method of transition of traction motors from series to parallel connection and back. Meanwhile, the controller is always kept in the right position for a quick response of dynamic braking.

There is thus provided a device of the character described affording automatic dynamic braking, higher acceleration rates and smoother operation of vehicle control than that afforded by conventional constructions. It is reasonable to expect that the invention will make possible improved schedule speeds, added safety and more comfort during operation of some types of traction vehicles, as well as increased reliability, longer life and reduced maintenance of the requisite control equipment.

While we have illustrated and described a particular embodiment of our invention, modifications will become apparent to those skilled in the art. We therefore, desire it to be understood that our invention is not to be limited to the particular arrangement described and intend in the appended claims to cover all modifilications which do not depart from the spirit and scope of our invention.

What we claim as new and desire to secure by Letters Patent of the United States is:

1. In an electric control system, the combination of a cam shaft actuated multiple contact controller, an electric motor adapted to drive said cam shaft, a notched index device arranged to be driven responsive to movement of said cam shaft, a notching interlock element adapted to engage the notches of said index device, power supply means for said motor, electric circuit means including a two-part switch for selectively energizing said motor from said power supply means for rotation of said cam shaft or for braking action thereof, mechanical means associated with said switch and with said notching interlock element for placing said switch under the control of said notching interlock element, and means associated with said switch for selectively rendering said mechanical means inoperative thereby to remove said switch from the control of said notching interlock element.

2. In a multiple unit vehicle control system, for each of said vehicles the combination of a separate motor driven cam shaft controller, an electric motor adapted to drive said controller, electric circuit means for selectively energizing said motor or applying braking thereto, and a notching mechanism comprising a star-wheel arranged to be driven responsive to movement of said controller and a switch adapted to be controlled by said star-wheel and associated with said electric circuit means to effect control therethrough for stopping said motor and said controller only in any one of a plurality of predetermined controller notching positions, whereby said stopping may be effected through said electrical circuit means and the shocks of braking action in a notching position may be electrically absorbed to provide greater accuracy of control and to reduce maintenance problems.

3. Automatic acceleration control for an electric drive motor comprising an accelerating resistance bank adapted to be arranged in series with said motors, a multiple contact controller having its contacts arranged to sequentially short-out progressively greater portions of said accelerating resistance bank, a pilot motor adapted to drive said controller, power supply means for said pilot motor, current responsive means arranged in the circuit of said drive motor to be responsive to current values therein and adapted to effect the interconnection of said pilot motor with said power supply means to effect the energization of said pilot motor from said means, and an electric notching mechanism arranged as an indexing mechanism according to position of said controller and arranged in the circuit of said pilot motor to prevent deenergization thereof in and out-of-notch position.

4. In a control system for an electric vehicle, the combination of a plurality of drive motors for said vehicle, switching means for selectively placing said drive motors substantially in series or parallel circuit relation, a resistance bank, switching means for selectively connecting predetermined portions of said resistance bank in circuit with said motors, a master notching controller, switching control means arranged to be actuated by movement of said master notching controller for adjusting the amount of said resistance bank in said circuit and for affecting transition from series to parallel circuit relation of said plurality of motors, an electric pilot motor adapted to drive said notching controller, first supervisory control means for energizing said pilot motor for one direction of rotation for accelerating said vehicle, second supervisory control means for energizing said pilot motor for the opposite direction of rotation for coasting and braking of said vehicle, first control means associated with said first supervisory control means and with the circuit of at least one of said drive motors to be responsive to a predetermined value of current therein for disabling said first supervisory control means from energizing said pilot motor thereby to hold up the acceleration sequence, second control means associated with said second supervisory control means and with the circuit of at least one of said drive motors to be responsive to a different value of current therein for disabling said second supervisory control means from energizing said pilot motor thereby to hold up the braking and coasting sequences, means associated with said master notching controller and with said pilot motor for preventing de-energization of said pilot motor unless said notching controller is in a notching position, and dynamic braking means associated with said pilot motor and arranged to be operative to stop said motor whenever said pilot motor is de-energized, whereby the mechanical shocks incident to the stopping and starting of said pilot motor and said master notching controller will be substantially primarily cushioned in the electric and magnetic circuits of said control system and said pilot motor.

5. Automatic acceleration control for an electric drive motor having an armature circuit and a field circuit, said control comprising an accelerating resistance bank adapted to be arranged in series with said motor and a field shunting resistance bank adapted to be arranged in parallel with said field circuit, a multiple contact controller having first operated contacts arranged to sequentially short-out progressively greater predetermined portions of said accelerating resistance bank and later operated contacts arranged to sequentially apply progressively smaller portions of said field shunting resistance bank, a pilot motor adapted to drive said controller, a notching index adapted to be driven responsive to movement of said controller, and a notching mechanism adapted to engage said notching index and arranged to affect the electric circuit connections of said pilot motor.

6. Automatic acceleration control for a plurality of electric drive motors, said control comprising an accelerating resistance bank adapted to be arranged in series with said motors, means for placing said motors in series circuit connection for reduced voltage starting, means for placing said motors in parallel circuit relation for high speed running, a multiple contact controller having its contacts arranged to sequentially short-out progressively greater predetermined portions of said accelerating resistance bank, supervisory means for selecting said series or parallel circuit relation of said motors, means associated with said multiple contact controller for holding up said parallel circuit selection unless a predetermined portion of said accelerating resistance bank remains in circuit with said motors, a pilot motor adapted to drive said controller, means for energizing said pilot motor responsive to said supervisory control, and notching means associated with said controller to prevent the de-energization of said pilot motor unless said controller contacts are fully opened or fully closed.

7. In an acceleration, transition and braking control system for each of a plurality of traction vehicles adapted to be self-powered and articulated, the combination of a plurality of vehicle driving motors, a drum type controller having a plurality of contacts each arranged to be closed only during a predetermined portion of the rotation of said drum controller, first control means including at least one of said controller contacts for selectively placing said vehicle driving motors in series or parallel circuit relation, an accelerating resistance bank, second control means including a plurality of said controller contacts for placing said motors in series with a selectively different predetermined portion of said accelerating resistance bank, an electric pilot motor arranged to drive said drum controller, a star-wheel having notches and adapted to be driven responsive to movement of said pilot motor and said controller, and means for energizing said pilot motor, said means including an electric switch in circuit with said motor and operatively associated with said star-wheel and adapted to engage the notches thereof to prevent subsequent de-energization of said motor except in a notching position of said star wheel, and said means for energizing said pilot motor including vehicle drive motor current responsive means for preventing energization of said pilot motor at times of high values of vehicle drive motor current.

8. Automatic acceleration and dynamic braking control for an electric drive motor comprising a resistance bank, switching means for placing said resistance bank in series with said motor to operate as an accelerating resistance, switching means for placing said resistance bank in series with a portion of said motor to operate as a dynamic braking resistance, a multiple contact controller, switching means associated with said motor and resistance bank circuits and with said multiple contact controller to provide that with one direction of operation of said controller contacts thereof will set up acceleration control and sequentially short-out progressively greater predetermined portions of said resistance bank and that for the opposite direction of operation thereof said contacts will set up said dynamic braking and sequentially short-out progressively greater predetermined portions of said resistance bank, an electric pilot motor adapted to drive said controller, electric notching means for said pilot motor and controller, and means arranged responsive to drive motor acceleration current for one direction of controller movement and to drive motor braking circuit for the other direction of controller movement and adapted to render said notching mechanism inoperative for low values of current in said circuits thereby to provide automatic acceleration and automatic braking control of said drive motor.

9. In a control system for one of a plurality of traction vehicles adapted to be self-driven when articulated together, the combination of a plurality of vehicle driving motors, a drum type controller having a plurality of contacts each adapted to be closed during a predetermined portion of the rotation of said controller, first control means including at least one of said controller contacts for selectively placing said vehicle driving motors first in series and later in parallel circuit relation for an acceleration sequence initiated by "forward" rotation of said drum controller, interlocking means for rendering said first control means inoperative during "reverse" rotation of said drum controller for vehicle braking, second control means including at least one of said controller contacts for applying dynamic braking to said drive motors during "reverse" rotation of said drum controller, an electric pilot motor connected to drive said drum controller, supervisory control connected in circuit with said pilot motor and for determining the direction of rotation thereof, a star-wheel having notches and arranged to be driven by said pilot motor, means including an electric notching relay having a contact in circuit with said supervisory control and said pilot motor and having a mechanical connection to said star-wheel to prevent opening of said contact and de-energization of said pilot motor unless said star-wheel is in notching position, a solenoid coil for said notching relay, a current limit relay having a contact adapted to energize said notching relay coil when said current limit relay is dropped out, means including a first coil for picking up said current limit relay responsive to a high value of vehicle drive motor current during acceleration, means including a second coil for picking up said current limit relay responsive to a different value of vehicle drive motor current during vehicle braking, a third coil for said current limit relay arranged in circuit with one of said controller contacts to provide compounding of said relay responsive to position of said drum controller, and a fourth coil for said current limit relay arranged in circuit with said pilot motor to provide compounding of said relay responsive to pilot motor speed of operation.

10. In a multiple unit system of traction vehicles, the combination of a plurality of vehicles each of which is provided with a traction motor, a source of electric power supply for said motors, switching means on each of said vehicles for connecting the respective motor to said source of power supply, additional switching means on each of said vehicles for establishing dynamic braking connections for the respective motor, control means on each of said vehicles for actuating said switching means, said control means comprising a motor operated controller having an electric pilot motor connected thereto to provide operation thereof, a plurality of electrical circuit connections comprising train lines interconnecting the control of each of said vehicles with the control of each of the other vehicles of the plurality, and a manually operable controller having a plurality of operative positions in which all of said control means are interconnected by said controller for simultaneous acceleration and braking operation of said motors through operation of each said electric pilot motors in each of said vehicles.

11. In a control system for an electrically powered vehicle, a driving motor having a field exciting winding, an accelerating resistor for said motor, means for connecting said motor and said resistor in circuit with a source of electric current supply thereby to drive said vehicle, switching means including a plurality of cam operated contacts for gradually reducing the resistance of said resistor to accelerate said vehicle, switching means including a plurality of cam operated contacts for gradually shunting said field exciting winding thereby to increase the speed of said vehicle, a cam shaft arranged to operate said cam operated contacts for reducing the resistance of said accelerating resistor and said cam operated contacts for shunting said field exciting winding, an electric pilot motor adapted to drive said cam shaft, means arranged responsive to current in said vehicle driving motor for energizing said electric pilot motor, and means for reversing the direction of rotation of said pilot motor responsive to supervisory control.

12. In each of a plurality of traction vehicles adapted to be articulated together and each to be self driven from a single master control station, a controller having cam operated contacts, an electric motor adapted to drive said controller, a star-wheel adapted to be driven responsive to movement of said motor and said controller, a notching interlock mechanism adapted to engage said star-wheel, solenoid means for holding said notching mechanism out of engagement with said star-wheel, means associated with said notching mechanism whereby for said out of engagement position power will be supplied to said motor, a plurality of vehicle driving motors adapted to be controlled by said controller, and means arranged responsive to low current values in one of said driving motors for energizing said solenoid means.

13. In each of a plurality of traction vehicles adapted to be articulated together and each to be self-driven from a single master control station, a controller having cam operated contacts, an electric motor adapted to drive said controller, a star-wheel adapted to be driven responsive to movement of said motor and said controller, a notching interlock mechanism adapted to engage said star-wheel, solenoid means for holding said notching mechanism out of engagement with said star-wheel, means associated with said notching mechanism whereby for one direction of movement thereof power may be supplied to said motor, means associated with said notching mechanism whereby for the opposite direction of movement thereof power will be removed from said controller motor and dynamic braking applied thereto for quick stopping thereof, a plurality of vehicle driving motors adapted to be controlled by said controller and means arranged responsive to high current in one of said driving motors for de-energizing said solenoid means thereby to stop movement of said controller.

14. A motor operated controller arranged to be responsive to low current values in an external circuit and comprising a current limit relay having a series coil connected in series circuit relation with said external circuit, said current limit relay having a normally closed contact adapted to be opened by high values of current in said external circuit and through said series coil, a notched device adapted to be driven responsive to movement of said motor operated controller, a plurality of power and control circuit contacts adapted to be selectively opened and closed by said motor operated controller, a notching interlock adapted to engage the notches of said notched device when said power and control circuit contacts are fully opened or fully closed, a notching interlock solenoid connected to disengage said notching interlock from said notches when said solenoid is energized, means for energizing said notching interlock solenoid through said current limit relay contact, a direct current motor connected to drive said motor operated controller and having a shunt field winding, a series field winding and an armature, means for energizing said shunt field winding, means for energizing said series field winding in circuit with said armature when said notching interlock is disengaged from said notches, means for applying dynamic braking to said direct current motor when said notching interlock engages said notches, switching means for reversing the direction of rotation of said direct current motor when energized, and supervisory control for said switching means.

15. A motor operated controller comprising an electric motor for driving said controller and means including a current limit relay for governing the operation of said motor, said current limit relay having a series coil, a rate coil, and a lift coil, means for energizing said series coil in accordance with values of current being controlled by said controller, means for energizing said rate coil in accordance with existing position of said controller, and means for energizing said lift coil in accordance with speed of operation of said electric motor.

16. In a control system adapted to selectively provide series operation, transition from series to parallel, and parallel operation of drive motors for a traction vehicle, first control means arranged responsive to manual supervision for initially placing said motors in series circuit connection, a transition resistance adapted to be placed in series with one of said motors and in parallel circuit relation with another of said motors, relay means arranged responsive to low current values in the circuit of one of said motors, second control means arranged responsive to additional manual supervision and to said relay means responsive to low current values for inserting said transition resistance in series with one of said motors and in parallel with the other of said motors, and third control means arranged responsive to said additional manual supervision and to said relay means responsive to low current values for thereafter removing said series circuit connection, placing said motors in parallel circuit connection and withdrawing said transition resistance.

17. In a traction vehicle, a motor operated controller having a notching mechanism, a pilot motor for driving said controller, means for energizing said pilot motor, said means being associated with said notching mechanism to prevent de-energization of said motor except in a notching position, a plurality of traction motors connected to drive said vehicle, a source of power for said traction motors, a series contactor for connecting at least one of said traction motors in series with at least one other of said traction motors when said series contactor is closed, at least one parallel contactor for placing said motors in parallel circuit relation when said parallel contactor is closed and said series contactor is opened, an accelerating resistance bank, at least one main line contactor adapted when closed to complete a circuit from said traction motors through said accelerating resistance bank from said source of power, "series" supervisory control arranged to close said series contactor and to close said main line contactor for low speed operation of said vehicle, "parallel" supervisory control for high speed operation of said vehicle, a plurality of contacts on said motor operated controller for cutting out predetermined portions of said accelerating resistance, relay means for causing said controller contacts to be operative with controller forward movement, means for energizing said controller pilot motor with actuation of said "series" supervisory control, an additional contact on said motor operated controller, and means associated with said additional contact for delaying transition from series to parallel with actuation of said "parallel" supervisory control until said motor operated controller can progress or retrogress to a predetermined position to allow a certain predetermined portion of said accelerating resistance to be in circuit with said traction motors.

18. In a traction vehicle, a plurality of traction motors connected to drive said vehicle, a source of power comprising a single line adapted to have a voltage with respect to ground, and an acceleration transition and braking control system for said motors, said control system comprising a series contactor for connecting at least one of said motors in series with at least one other of said motors when said series contactor is closed, at least one parallel contactor for placing said motors in parallel circuit relation when said parallel contactor is closed and said series contactor is open, a first line breaker adapted when closed to connect said single line source of power to said series or parallel arrangement of motors, an accelerating resistance bank, a cushioning resistance, at least one main line contactor adapted when closed to complete a circuit from said series or parallel arrangement of motors through said cushioning resistance and through said accelerating resistance bank to ground, "switching" supervisory control arranged to close said series contactor and to close said main line contactor for low speed or "switching" operation of said vehicle, a cushioning contactor arranged to short circuit said cushioning resistance, "series" supervisory control arranged to close said cushioning contactor for intermediate speed operation of said vehicle, a circuit comprising a transition resistor in series with a transition contactor, said circuit when said contactor is closed being arranged to complete a circuit for one of said motors through said transition resistance regardless of position of series or parallel contactors, "parallel" supervisory control for high speed operation of said vehicle, means associated with said "parallel" supervisory contact for (when going from "series" to "parallel") first closing said transition contactor, then opening said series contactor and closing said parallel contactor, and then opening said transition contactor, means including a motor operated controller for cutting out predetermined portions of said accelerating resistance responsive to controller forward movement initiated by said "series" supervisory control, means including said motor operated controller for shunting said motor fields for highest speed operation of said vehicle, at least one braking contactor adapted to short out said traction motors through said accelerating resistance for dynamic braking action, "braking" supervisory control arranged to open said line breaker, open said cushioning contactor and close said braking contactor, current responsive means including said motor operated controller for adjusting the amount of said accelerating resistance thereby used as a braking resistance, and means including additional field shunting means for said traction motor fields for differentiating between braking and coasting.

19. In an acceleration, transition and braking control system for a self-powered traction vehicle adapted to be articulated with similar vehicles with all controlled from a single one of said vehicles, trolley means for supplying electrical power to said vehicle, a plurality of traction motors adapted to drive said vehicle, a plurality of train line circuits adapted to interconnect said vehicle with said similar vehicles for the control of said motors, first control means operatively associated with at least one of said train lines for arranging said motors in series circuit connection and applying said trolley power thereto for reduced voltage starting, second control means operatively associated with at least one of said train lines for thereafter applying a transition connection to said motors and thereafter reconnecting said motors in parallel circuit relation with each other and in series with said trolley power, current limiting means arranged to hold up the action of said second control means unless traction motor current is below a predetermined value, said current limiting means including a motor operated cam shaft, a pilot motor for driving said cam shaft, and means for energizing said motor responsive to low values of traction motor current and to said first and second control means associated with said train lines.

20. The combination of a motor operated multicontact controller adapted to be run from an "off" through an intermediate "transition" to an "on" position, a pilot motor for driving said controller, means for energizing said pilot motor, electric notching means associated with said energizing means to prevent de-energization of said pilot motor except in any one of a plurality of predetermined controller notching positions, pilot motor reversing means for reversing the direction of rotation of said controller when said pilot motor is energized, a plurality of main electric motors to be controlled by said controller, means including a plurality of contacts on said controller for inserting a gradually decreasing resistance in series with said motors with progression of said controller from "off" to "on" position thereof for acceleration control of said main electric motors, means associated with said pilot motor energizing means and arranged responsive to low values of main motor current for providing automatic acceleration control of said main motors by intermittent notching action of said pilot motor driving said controller from said "off" towards said "on" position, switching means for placing said main motors in series circuit connection, supervisory control means associated with said switching means and associated with said pilot motor energizing means for simultaneously actuating said switching means and energizing said pilot motor to initiate said automatic acceleration control, switching means for placing said main motors in parallel circuit connection, supervisory control means associated with at least one of said controller contacts for causing said pilot motor to drive said controller to said transition position and thereafter actuating said switching means for placing said main motors in parallel circuit connection when said motor operated controller has reached said transition position, switching means including a plurality of contacts on said controller adapted to place said motors in an immediately operable dynamic braking connection in series with a resistance which is adapted to decrease with retrogression of said controller toward the "off" position thereof for dynamic braking of said main electric motors, supervisory control means for actuating said last mentioned switching means and associated with said pilot motor energizing means and said pilot motor reversing means for causing said controller retrogression when dynamic braking is thereby called for, means associated with said pilot motor energizing means and arranged responsive to low values of main motor dynamic braking current for providing automatic braking control of said main motors by intermittent notching action of said pilot motor driving said controller back towards said "off" position, and an arrangement of electric control circuit lines adapting said controller to be interconnected with like motor operated controllers all to be operated from a single supervisory control station.

21. The combination of a motor operated multi-contact controller adapted to be run from an "off" through an intermediate "transition" to an "on" position, a pilot motor for driving said controller, means for energizing said pilot motor, electric notching means associated with said energizing means to prevent de-energization of said pilot motor except in any one of a plurality of predetermined controller notching positions, pilot motor circuit reversing means for reversing the direction of rotation of said pilot motor when energized, a plurality of main electric motors adapted to be controlled by said controller, means including a plurality of contacts on said controller for inserting a gradually decreasing resistance in series with said motors with progression of said controller from "off" to "on" position thereof for acceleration control of said main electric motors, means associated with said pilot motor energizing means and arranged responsive to low values of main motor current for providing automatic acceleration control of said main motors by intermittent or notching action of said pilot motor driving said controller from said "off" towards said "on" position, switching means for placing said main motors in series circuit connection, supervisory control means for actuating said switching means and associated with said pilot motor energizing means for simultaneously energizing said pilot motor to initiate said automatic acceleration control, means associated with one of said controller contacts for rendering said supervisory control means inoperative unless said controller is in said "off" position, switching means for placing said main motors in parallel circuit connection, supervisory control means associated with a different one of said controller contacts for actuating said switching means for placing said main motors in parallel circuit connection whenever said motor operated controller has reached said transition position, switching means including a plurality of contacts on said controller for placing said motors in an immediately operable dynamic braking connection in series with an effective resistance which gradually decreases with retrogression of said controller toward the "off" position thereof for dynamic braking of said main electric motors, supervisory control means for actuating said last mentioned switching means and associated with said pilot motor energizing means and said pilot motor circuit reversing means for causing said controller retrogression when dynamic braking is thereby called for, means associated with said pilot motor energizing means and arranged responsive to low values of main motor dynamic braking current for providing automatic braking control of said main motors by intermittent or notching action of said pilot motor driving said controller back towards said "off" position, and means associated with said supervisory control for placing said main motors in parallel circuit connection and associated with at least one of said controller contacts and associated with said means for energizing said pilot motor and associated with said pilot motor circuit reversing means for (when parallel operation is called for) delaying transition from series to parallel until said pilot motor is first caused to drive said controller forward or back to said "transition" position.

22. The combination of a motor operated multicontact controller adapted to be run from an "off" through an intermediate "transition" to an "on" position, a pilot motor for driving said controller, means for energizing said pilot motor, electric notching means associated with said energizing means to prevent de-energization of said pilot motor except in any one of a plurality of predetermined controller notching positions, pilot motor circuit reversing means for reversing the direction of rotation of said controller when driven by said motor, a plurality of main electric motors adapted to be controlled by said controller, means including a plurality of contacts on said controller for inserting a gradually decreasing resistance in series with said motors with progression of said controller from "off" to "on" position thereof for acceleration control of said main electric motors, means associated with said pilot motor energizing means and arranged responsive to low values of main motor current for providing automatic acceleration control of said main motors by intermittent or notching action of said pilot motor driving said controller from said "off" towards said "on" position, switching means for placing said main motors in series circuit connection, supervisory control means for actuating said switching means and associated with said pilot motor energizing means for simultaneously energizing said pilot motor to initiate said automatic acceleration control, means associated with one of said controller contacts for rendering said supervisory control means inoperative to initiate said control unless said controller is in said "off" position, switching means for placing said main motors in parallel circuit connection, supervisory control means associated with a different one of said controller contacts for actuating said switching means for placing said main motors in parallel circuit connection when said motor operated controller has reached said transition position, switching means including a plurality of contacts of said controller for placing said motors in an immediately operable dynamic braking connection in series with an effective resistance which will gradually decrease with retrogression of said controller toward the "off" position thereof for dynamic braking of said main electric motors, supervisory control means for actuating said last mentioned switching means and associated with said pilot motor energizing means and said pilot motor circuit reversing means for causing said controller retrogression when dynamic braking is thereby called for, means associated with said pilot motor energizing means and arranged responsive to low values of main motor dynamic braking current for providing automatic braking control of said main motors by intermittent or notching action of said pilot motor driving said controller back towards said "off" position, an arrangement of electric control circuit lines for adapting said controller to be interconnected with like motor operated controllers all to be operated from a single supervisory control station, and means associated with said supervisory control for placing said main motors in parallel circuit connection and associated with said controller contacts and with said means for energizing said pilot motor and with said pilot motor circuit reversing means for (when parallel operation is called for) delaying transition from series to parallel until said pilot motor is first caused to drive said controller forward or back to said "transition" position.

23. The combination of a motor operated multicontact controller adapted to be run from an "off" through an intermediate "transition" to an "on" position, a pilot motor for driving said controller, means for energizing said pilot motor, electric notching means associated with said energizing means and arranged to prevent de-energization of said pilot motor except in any one of a plurality of predetermined controller notching positions, a plurality of main electric motors arranged to be controlled by said controller, means including a plurality of contacts on said controller for inserting a gradually decreasing resistance in series with said main motors with progression of said controller from "off" to "on" position thereof for acceleration control of said motors, means associated with said pilot motor energizing means and arranged responsive to low values of main motor current for providing automatic acceleration control of said main motors by intermittent notching action of said pilot motor driving said controller from said "off" towards said "on" position, a field exciting winding for each of said main motors, means for shunting each of said field exciting windings through an associated resistance, means for progressively changing the effective value of each of said last mentioned resistances, and means including a plurality of said controller contacts arranged to operate only adjacent the "on" or upper limit of travel of said controller for affecting said field shunting approximately at the end of said acceleration control sequence.

24. The combination of a motor operated multicontact controller adapted to be run from an "off" through an intermediate "transition" to an "on" position, a pilot motor for driving said controller, means for energizing said pilot motor, electric notching means associated with said energizing means to prevent de-energization of said pilot motor except in any one of a plurality of predetermined controller notching positions, pilot motor circuit reversing means for reversing the direction of rotation of said pilot motor when energized, a plurality of main electric motors to be controlled by said controller, means including a plurality of contacts on said controller for inserting a gradually decreasing resistance in series with said motor with progression of said controller from said "off" to said "on" position thereof for acceleration control of said main electric motors, means associated with said pilot motor energizing means and arranged responsive to low values of main motor current for providing automatic acceleration control of said main motors by intermittent notching action of said pilot motor driving said controller from said "off" towards said "on" position, switching means for placing said main motors in series circuit connection, supervisory control means for actuating said switching means and associated with said pilot motor energizing means for simultaneously energizing said pilot motor to initiate said automatic acceleration control, switching means for placing said main motors in parallel circuit connection, supervisory control means associated with a contact on said controller for actuating said switching means for placing said main motors in parallel circuit connection when said motor operated controller has reached said transition position, each of said main drive motors having a field exciting winding, means for shunting each of said field exciting windings through an associated resistance, means for progressively changing the effective value of each said last mentioned resistance, and means including a plurality of contacts on said controller arranged to operate adjacent the "on" or upper limit of travel of said controller for affecting said field shunting approximately at the end of said acceleration control sequence.

25. The combination of a motor operated multicontact controller adapted to be run from an "off" through an intermediate transition to an "on" position, a pilot motor for driving said controller, means for energizing said pilot motor, electric notching means associated with said energizing means and arranged to prevent de-energization of said pilot motor except in any one of a plurality of predetermined controller notching positions, pilot motor circuit reversing means for reversing the direction of rotation of said pilot motor when energized, a plurality of main electric motors arranged to be controlled by said controller, means including a plurality of contacts on said controller for inserting a gradually decreasing resistance in series with said motors with progression of said controller from "off" to "on" position thereof for acceleration control of said main electric motors, means associated with said pilot motor energizing means and arranged responsive to low values of main motor current for providing automatic acceleration control of said main motors by intermittent or notching action of said pilot motor driving said controller from, said "off" towards said "on" position, switching means including a plurality of contacts on said controller for placing said motors in an immediately operable dynamic braking connection in series with a resistance the effective value of which gradually decreases with retrogression of said controller toward the "off" position for dynamic braking of said main electric motors, supervisory control means for actuating said last mentioned switching means and associated with said pilot motor energizing means and said pilot motor circuit reversing means for causing said controller retrogression when dynamic braking is called for, means associated with said pilot motor energizing means and arranged responsive to low values of main motor dynamic braking current for providing automatic braking control of said main motors by intermittent or notching action of said pilot motor driving said controller back towards said "off" position, each of said main drive motors having a field exciting winding, means for shunting said field exciting winding through a resistance, means for progressively changing the effective value of said last mentioned resistance, and means including a plurality of contacts on said controller arranged to operate adjacent the "on" or upper limit of travel thereof for affecting said field shunting approximately at the end of said acceleration control sequence.

26. The combination of a motor operated multicontact controller adapted to be run from an "off" through an intermediate "transition" to an "on" position, a pilot motor for driving said controller, means for energizing said pilot motor, electric notching means associated with said energizing means and adapted to prevent de-energization of said pilot motor except in any one of a plurality of predetermined controller notching positions, pilot motor circuit reversing means for reversing the direction of rotation of said pilot motor when energized, a plurality of main electric motors to be controlled by said controller, means including a plurality of contacts on said controller for inserting a gradually decreasing resistance in series with said motors with progression of said controller from "off" to "on" position thereof for acceleration control of said main electric motors, means associated with said pilot motor energizing means and arranged responsive to low values of main motor current for providing automatic acceleration control of said main motors by intermittent or notching action of said pilot motor driving said controller from said "off" towards said "on" position, switching means for placing said main motors in series circuit connection, supervisory control means for actuating said switching means and associated with said pilot motor energizing means for simultaneously energizing said pilot motor to initiate said automatic acceleration control, means associated with one of said controller contacts for rendering said supervisory control means initially inoperative unless said controller is in said "off" position, switching means for placing said main motors in parallel circuit connection, supervisory control means associated with a contact on said controller for actuating said switching means for placing said main motors in parallel circuit connection when said motor operated controller has reached said transition position, switching means including a plurality of contacts on said controller for placing said motors in an immediately operable dynamic braking connection in series with a resistance the effective value of which is adapted to gradually decrease with retrogression of said controller toward the "off" position thereof for dynamic braking of said main electric motors, supervisory control means for actuating said last mentioned switching means and associated with said pilot motor energizing means and said pilot motor circuit reversing means for causing said controller retrogression when dynamic braking is called for, means associated with said pilot motor energizing means and arranged responsive to low values of main motor dynamic braking current for providing automatic braking control of said main motor by intermittent or notching action of said pilot motor driving said controller back towards said "off" position, for each of said main motors a field exciting winding, means for shunting said field exciting winding through a resistance, means for progressively changing the effective value of said last mentioned resistance, and means including a plurality of contacts on said controller arranged to operate adjacent the "on" or upper limit of travel thereof for affecting said field shunting approximately at the end of said acceleration control sequence.

27. The combination of a motor operated multicontact controller adapted to be run from an "off" through an intermediate "transition" to an "on" position, a pilot motor for driving said controller, means for energizing said pilot motor, electric notching means associated with said energizing means and adapted to prevent de-energization of said pilot motor except in any one of a plurality of predetermined controller notching positions, pilot motor circuit reversing means for reversing the direction of rotation of said pilot motor when energized, a plurality of main electric motors to be controlled by said controller, means including a plurality of contacts on said controller for inserting a gradually decreasing resistance in series with said motors with progression of said controller from "off" to "on" position thereof for acceleration control of said main electric motors, means associated with said pilot motor energizing means and arranged responsive to low values of main motor current for providing automatic acceleration control of said main motors by intermittent or notching action of said pilot motor driving said controller from said "off" towards said "on" position, switching means for placing said main motors in series circuit connection, supervisory control means for actuating said switching means and associated with said pilot motor energizing means for simultaneously energizing said pilot motor to initiate said automatic acceleration control, means associated with a contact on said controller for rendering said supervisory control means initially inoperative unless said controller is in said "off" position, switching means for placing said main motors in parallel circuit connection, supervisory control means associated with a different contact on said controller for first driving said controller toward said transition position and then actuating said switching means for placing said main motors in parallel circuit connection when said motor operated controller has reached said transition position, switching means including a plurality of contacts on said controller adapted to place said motors in an immediately operable dynamic braking connection in series with a resistance which gradually decreases with retrogression of said controller toward the "off" position thereof for dynamic braking of said main electric motors, supervisory control means for actuating said last mentioned switching means and associated with said pilot motor energizing means and said pilot motor circuit reversing means for causing said controller retrogression when dynamic braking is thereby called for, means associated with said pilot motor energizing means and arranged responsive to low values of main motor dynamic braking current for providing automatic braking control of said main motors by intermittent notching action of said pilot motor driving said controller back towards said "off" position, means associated with said supervisory control for placing said main motors in parallel circuit connection and associated with said controller contacts and with said means for energizing said pilot motor and with said pilot motor circuit reversing means for (when parallel operation is called for) delaying transition from series to parallel until said pilot motor is caused to drive said controller forward or back to said "transition" position, each of said main drive motors having a field exciting winding, means for shunting each said field exciting winding through a resistance, means for progressively changing the effective value of each of said last mentioned resistances, and means including a plurality of said controller contacts arranged to operate adjacent the "on" or upper limit of travel of said controller for affecting said field shunting approximately at the end of said accelerating sequence.

28. The combination of a motor operated multicontact controller adapted to be run from an "off" through an intermediate "transition" to an "on" position, a pilot motor for driving said controller, means for energizing said pilot motor, electric notching means associated with said energizing means and adapted to prevent de-energization of said pilot motor except in any one of a plurality of predetermined controller notching positions, pilot motor circuit reversing means for reversing the direction of rotation of said pilot motor when energized, a plurality of main electric motors to be controlled by said controller, means including a plurality of contacts on said controller for inserting a gradually decreasing resistance in series with said motors with progression of said controller from "off" to "on" position thereof for acceleration control of said main electric motors, means associated with said pilot motor energizing means and arranged responsive to low values of main motor current for providing automatic acceleration control of said main motors by intermittent notching action of said pilot motor driving said controller from said "off" towards said "on" position, switching means for placing said main motors in series circuit connection, supervisory control means for actuating said switching means and associated with said pilot motor energizing means for simultaneously energizing said pilot motor to initiate said automatic acceleration control, means associated with a contact on said controller for rendering said supervisory control means initially inoperative unless said controller is in said "off" position, switching means for placing said main motors in parallel circuit connection, supervisory control means associated with a different contact on said controller for actuating said switching means for placing said main motors in parallel circuit connection when said motor operated controller has reached said transition position, switching means including a plurality of contacts on said controller and adapted to place said motors in an immediately operable dynamic braking connection in series with a resistance the effect of which gradually decreases with retrogression of said controller toward the "off" position thereof for dynamic braking of said main electric motors, supervisory control means for actuating said last mentioned switching means and associated with said pilot motor energizing means and said pilot motor circuit reversing means for causing said controller retrogression when dynamic braking is thereby called for, means associated with said pilot motor energizing means and arranged responsive to low values of main motor dynamic braking current for providing automatic braking control of said main motors by intermittent notching action of said pilot motor driving said controller back towards said "off" position, an arrangement of electric control circuit lines for adapting said controller to be interconnected with like motor operated controllers all to be operated from a single supervisory control station, means associated with said supervisory control for placing said main motors in parallel circuit connection and associated with said means for energizing said pilot motor and with said pilot motor circuit reversing means for (when parallel operation is called for) delaying transition from series to parallel until said pilot motor is caused to drive said controller forward or back to said "transition" position, for each of said main motors a field exciting winding, means for shunting said field exciting winding through a resistance, means for progressively changing the effective value of said last mentioned resistance, and means including a plurality of contacts on said controller arranged to operate adjacent the "on" or upper limit of travel of said controller for affecting said field shunting approximately at the end of said acceleration control sequence.

IRA W. LICHTENFELS.
HAROLD G. MOORE.

REFERENCES CITED

The following references are of record in the file of this patent:

UNITED STATES PATENTS

| Number | Name | Date |
|---|---|---|
| 2,041,580 | Tritle | May 19, 1936 |
| 2,066,920 | Wilby et al. | Jan. 5, 1937 |
| 2,078,783 | Riley et al. | Apr. 27, 1937 |
| 2,245,092 | McNairy et al. | June 10, 1941 |